June 20, 1939. E. NASSIMBENE 2,163,347
ENDLESS FLEXIBLE BELT
Filed Feb. 17, 1936

Inventor
E. Nassimbene,
By Chuck & Church
His Attorneys

Patented June 20, 1939

2,163,347

UNITED STATES PATENT OFFICE 2,163,347

ENDLESS FLEXIBLE BELT

Ernest Nassimbene, Denver, Colo., assignor to The Gates Rubber Company, Denver, Colo., a corporation of Colorado Application February 17, 1936, Serial No. 64,410

5 Claims. (Cl. 74—233)

This invention relates to improvements in flexible belts, preferably of the V-type, which has sloping side walls adapted to contact with the adjacent sides of one or more grooved pulleys, the inner surface of the belt not touching the bottom of the groove, whereby the belt wedges in the groove and thus insures tight contact with the pulley.

The invention is especially applicable to the production of endless or spliced flexible V-belts, for use on adjustable pulleys, for instance of the type wherein the sides of the pulley may be adjusted toward and away from each other, whereby the width of the groove is varied to position the belt relatively to the center of rotation of the pulley, thereby varying the speed of the belt and pulley. Generally stated, the primary object of the invention is to provide a flexible belt wherein the disintegration of the belt or the separation of the elements composing the same is greatly reduced and the life of the belt correspondingly increased. Specifically, the invention contemplates the incorporation in the belt of means which will substantially eliminate transverse flexing of the belt while at the same time allowing the belt to freely flex around the sheave and straighten out between the sheaves, thus reducing to a minimum the amount of relative movement or shifting of the several elements constituting the belt. The present construction also aids in maintaining the shape of the belt in cross section, regardless of the diameter of the pulleys, thus effecting a more uniform wear and longer life for the belt.

Preferably, these reinforce means consist of a plurality of transversely disposed elements which may be formed of comparatively hard rubber and which are substantially rigid transversely of the belt, but are so embodied in the belt that the several ribs, as a group, are free to flex longitudinally of the belt. These reinforce elements are located between the neutral axis of the belt and the outer surface of the belt as it passes around the pulley. Preferably, the recesses formed between the transverse reinforce ribs are filled with comparatively soft rubber, and if desired, one or more layers of woven fabric material may be interposed between this filler and the ribs. In view of the use of this woven fabric at this point, it is possible that only the two side surfaces and the inner surface of the belt need be provided with a fabric covering, rubberized woven fabric usually being used for this purpose. In other words, the outer face of the belt may be formed by the uncovered rubber.

With these and other objects in view, the invention consists in certain details of construction and combinations and arrangements of parts, all as will hereinafter be more fully described and the novel features thereof particularly pointed out in the appended claims.

In the accompanying drawing—

Figure 1:
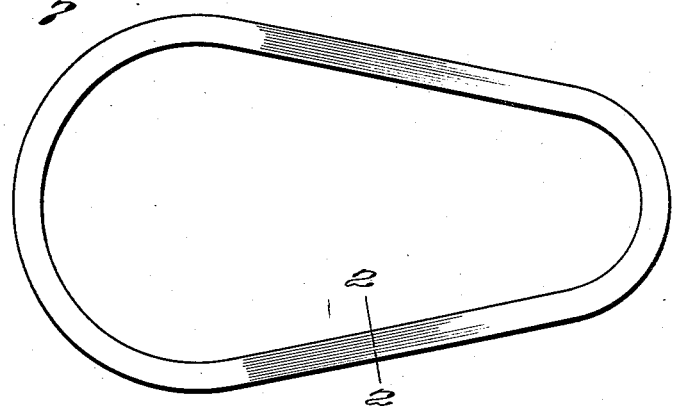
Figure 1 is a side elevation of a V-belt.
Figure 2:
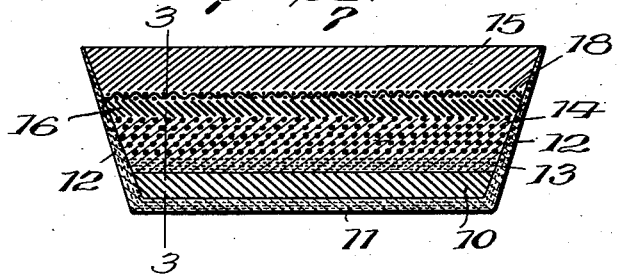
Fig. 2 is a sectional view taken transversely of the belt on the line 2—2 of Fig. 1.
Figure 3:
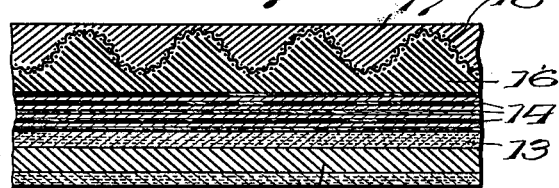
Fig. 3 is a fragmentary sectional view taken longitudinally of the belt on the line 3—3 of Fig. 2.

Of course, the major portion, or what might be termed the body portion, of the belt, may be composed of various structural elements. In the present instance, it is shown as being composed of an inner layer 10 of rubber protected by the covering 11, which extends across the bottom or inner face of the belt as well as the sides 12 of the belt. Next to, or above, the rubber 10, there is a layer of rubberized woven fabric 13. Fabric 13 may be plied, if necessary, to build up this layer to a thickness such as may be desired in the particular type of belt under construction. When the fabric 13 is used, it may be cut either on the bias or straight. Next above, so to speak, this rubberized woven fabric, is a substantially inextensible core composed of cords 14 embedded in rubber compound. This core is formed by the cords 14 properly cushioned and extending longitudinally of the belt or substantially along the neutral axis of the belt, all as is common practice in the art. At the present, the construction described is believed preferable, but as stated, it may be varied as desired. Between this body portion, the outer surface of which may be said to be formed by the core 14, and the exterior or outer surface 15 of the belt, the belt is provided with means which will resist transverse flexing and cross-sectional deformation thereof without interfering with the longitudinal flexing of the belt as it comes into contact with and passes around and leaves the periphery of a pulley.

In a broad sense, these reinforce means may be said to be composed of a plurality of members extending transversely of the belt between the core or neutral axis of the belt and the exterior surface of the belt, said means being substantially rigid transversely of the belt but capable of flexing, as a group, longitudinally of the belt. In the preferred construction, these reinforce means are formed by a layer of comparatively hard rubber 16 next to the core 14, said layer of rubber being formed with transversely extending ridges forming what may be described as lines of weakness between the ridges, with the thickness of the ridges such as to resist transverse flexing of the body of rubber 16 while the thickness of the reduced portions is such as to permit free flexing of the belt longitudinally as it passes around pulleys. These reduced portions of the body of rubber 16 function as hinges between each two ribs or ridges so that the entire mass of rubber 16 may be said to consist of a plurality of articulated, transversely extending ribs capable of flexing, as a group, longitudinally of the belt, but individually capable of resisting transverse flexing of the belt.

In order to give the exterior surface of the belt a finished appearance, and to provide side walls having a maximum area of contact, the transverse depressions, formed by the so-called lines of weakness in the rubber 16, are filled with a resilient filler 17, preferably a comparatively soft rubber compound. It is also preferred that a layer or sheet of fabric be interposed between this soft rubber filler and the hard rubber 16, such fabric being indicated at 18.

It will be understood that after the several structural elements, thus described, have been assembled, the assembled belt is subjected to the usual vulcanizing treatment.

In the finished belt illustrated, it will be observed that the cover extends only around the inner or bottom face of the belt and the two side surfaces thereof, leaving the outer surface exposed. However, as previously indicated, the covering fabric may extend entirely around the belt. When in use, the sloping side walls of the belt contact with the adjacent sides of the grooved pulley with the inner face of the belt spaced from the bottom of the groove so that the belt wedges in the groove and thus insures maximum driving engagement with the pulley. As is understood, when any given point lengthwise of a flexible belt comes into contact with a pulley, it flexes to adapt itself to the curvature of the pulley and in so doing flexes or becomes cupped transversely, the transverse deflection increasing as the diameter of the pulley decreases. This flexing movement tends to set up relative movements between the various structural elements, but in the present belt, this tendency of the various elements to move relatively to one another, or become "cupped", is reduced to a minimum, or eliminated, by the transverse reinforce means composed of the body of rubber 16. At the same time, the inner portion of the belt body, which might be defined as that portion between the core 14 and the inner surface of the belt, will be free to expand laterally upon longitudinal flexing of the belt. This is due to the fact that this so-called inner portion is formed essentially of a flexible, resilient mass, free of transverse reinforcements such as the hard rubber ribs in the outer portion, and the additional fact that the inner surface of the belt is smooth and free of any substantial indentations. This disintegration of the belt or the separation of the several structural elements is believed to be more noticeable where the belt is used on pulleys whose sides are adjustable toward and from each other for the purpose of varying the speed of the belt and the peripheral speed of the pulley so that the present invention is especially applicable to belts designed for this usage. Actual tests with belts of this construction under conditions existing in the usage of the belt on adjustable pulleys have given highly satisfactory results in that the belts so tested have stood up considerably longer than is the case of belts without the transverse reinforce means and it is, therefore, believed that this increase of life is largely due to the reinforce means or ribs constantly maintaining the original cross section of the belt as it traverses the periphery of the pulley.

Figure 4:
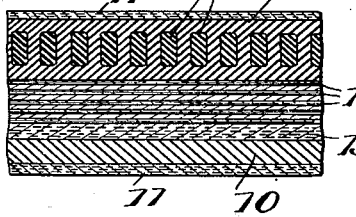
Fig. 4 is a similar view illustrating a modified form of belt.

In the modified construction illustrated in Fig. 4, the transversely disposed reinforcing members 16ª, preferably of comparatively hard rubber are actually formed separately and embedded in the body of comparatively soft rubber 17. As indicated in this modification, the intermediate layer 18 of fabric may be omitted. Also, as shown in this form of the invention, the covering fabric 11 may extend entirely around the belt, this point being optional regardless of the presence or absence of fabric 18.

While reference has been made to use of the present belt on grooved pulleys only, it will be understood that it is susceptible of use with other forms of drives embodying one or more grooved pulleys in combination with other types of pulleys.

What I claim is:

1. A longitudinally flexible belt having inner and outer surfaces, a substantially inextensible core disposed longitudinally of said belt, a series of transversely disposed elements of comparatively hard rubber between said core and outer surface, said elements being substantially rigid transversely of the belt whereby transverse flexing of the outer portion of the belt is prevented, said members being spaced from one another longitudinally of the belt and a filler of resilient flexible material between said members whereby longitudinal flexing of the belt is augmented, the belt body between said core and inner surface being formed of resilient material and the inner surface of the belt being substantially free of indentations whereby said inner portion will expand laterally when the belt is flexed longitudinally.

2. A longitudinally flexible belt having inner and outer surfaces with a neutral axis located between said surfaces, a series of substantially rigid reinforce members disposed transversely of the belt between said neutral axis and said outer surface whereby transverse flexing of the outer portion of the belt is prevented, said members being spaced from one another longitudinally of the belt and a filler of resilient flexible material between said members whereby longitudinal flexing of the belt is augmented, the belt body between said neutral axis and the inner surface of the belt being formed essentially of resilient material and being substantially smooth at the inner surface of the belt whereby it will expand laterally under longitudinal flexing of the belt.

3. A flexible belt having inner and outer surfaces and a neutral axis located in a plane intermediate said surfaces, a continuous body of comparatively hard rubber between said outer surface and the plane of said neutral axis, said body of hard rubber having ribs formed thereon transversely of the belt whereby transverse flexing of the belt is prevented, said body of hard rubber being flexible longitudinally of said belt, the inner portion of the body of said belt between the said inner surface and the plane of said neutral axis being formed of resilient, expandible material and said inner surface being free of ribs whereby the said inner portion of the belt body will expand under longitudinal flexing of the belt.

4. A flexible belt having inner and outer surfaces with a neutral axis located in a plane intermediate said surfaces, a continuous body of comparatively hard rubber between the plane of said neutral axis and the said outer surface whereby lateral flexing of the outer portion of the belt is prevented, said body of hard rubber having lines of weakness formed therein transversely of the belt whereby the latter can flex longitudinally, and a continuous body of resilient material between the plane of the neutral axis and the inner surface of the belt, said inner surface being smooth and substantially free of indentations whereby said body of resilient material will expand laterally when the belt is flexed longitudinally.

5. A flexible belt having inner and outer surfaces with a neutral axis located in a plane intermediate said surfaces, longitudinally spaced, comparatively hard rubber members extending transversely of the belt between said outer surface and the plane of the neutral axis, said members being substantially rigid transversely of the belt but flexible as a group longitudinally of the belt, a filler of resilient, flexible material between said hard rubber members imparting a smooth outer surface to the belt, and whereby longitudinal flexing of the belt is augmented and a continuous flexible resilient inner body portion between said inner surface and the plane of the neutral axis, said inner surface being substantially smooth and free of indentations whereby said resilient inner body portion will expand laterally when said belt flexes longitudinally.

ERNEST NASSIMBENE.